United States Patent [19]

Gartner

[11] Patent Number: 4,619,702

[45] Date of Patent: Oct. 28, 1986

[54] RARE EARTH MODIFIERS FOR PORTLAND CEMENT

[75] Inventor: Ellis M. Gartner, Glenview, Ill.

[73] Assignee: Union Oil Company of California, Los Angeles, Calif.

[21] Appl. No.: 610,345

[22] Filed: May 15, 1984

[51] Int. Cl.$^4$ ................................................ C04B 7/02
[52] U.S. Cl. ...................................... 106/89; 106/100; 106/104; 106/314
[58] Field of Search ............ 106/89, 105, 314, 100, 106/104

[56] References Cited

U.S. PATENT DOCUMENTS

| | | | |
|---|---|---|---|
| 3,649,316 | 3/1972 | Uno et al. | 106/89 |
| 3,827,982 | 8/1974 | Hall et al. | 106/105 |
| 4,087,573 | 5/1978 | Holcombe, Jr. et al. | 427/372 R |
| 4,148,663 | 4/1979 | Holcombe, Jr. | 106/105 |
| 4,220,475 | 9/1980 | Tokar et al. | 106/89 |

OTHER PUBLICATIONS

W. Gutt and M. A. Smith, "Cerium as Minor Component in Cement Manufacture", *Cement Technology*, Jan., 1970, pp. 17–21.

P. F. Rumyantsev and Z. I. Skotnikonova, "Effect of Lanthanium Oxide on the Formation Kinetics and Properties of Cement Clinker", *Foreign Technology Division Air Force Systems Command*, FTD-HT-23-858-72.

*Primary Examiner*—William R. Dixon, Jr.
*Assistant Examiner*—Steven Capella
*Attorney, Agent, or Firm*—Dean Sandford; Gregory F. Wirzbicki; Alan H. Thompson

[57] ABSTRACT

Rare earth elements, added to the raw materials mixture fed to a cement kiln, produce cement compositions having increased early compressive strengths. Preparation of such cements requires less grinding of clinkers to achieve equivalent early strengths than similar compositions without the rare earth elements.

34 Claims, No Drawings

RARE EARTH MODIFIERS FOR PORTLAND CEMENT

BACKGROUND OF THE INVENTION

1. Field of the Invention

The present invention relates to the production of portland cement. More particularly, the invention relates to raw mixes for producing portland cement clinker, and especially to cement compositions which develop high compressive strengths at early ages.

2. Description of the Prior Art

In the typical commercial production of portland-type cements, a calcareous type material, such as limestone, and an argillaceous type material, such as clay, are used to obtain a mixture of lime, aluminum oxide, silicon dioxide, and ferric oxide. These "raw" materials are first pulverized into a homogeneous mixture, either in dry or slurry form, and then thermally processed in a kiln, usually or a rotary type, at temperatures normally ranging from about 1,400° C. to about 1,600° C. to form solid "clinkers." The basic reaction is such that the lime (usually as $CaCO_3$), upon heating, releases carbon dioxide ($CO_2$) to form calcium oxide (CaO) or free lime which in turn reacts with the alumina ($Al_2O_3$), iron oxide ($Fe_2O_3$), and silicon dioxide ($SiO_2$) to form the components of cement clinker. Clinkers are in turn ground to form a fine-powdered cement. Certain "mineralizers" may be added to the raw mix prior to the "clinkering," and certain "additions" (such as gypsum) may be added to a clinker during grinding to improve the strength and setting properties of the resulting cement. The composition of the cement depends upon the nature and proportion of the raw materials, mineralizers and additions employed, as well as the temperature of ignition and the extent of grinding.

The major components of portland cement clinker are calcium silicates ($C_3S$ and $C_2S$), tri-calcium aluminate ($C_3A$), and calcium alumino-ferrite ($C_4AF$), all of which form the hydraulically active ingredients of portland cements. For convenience herein, certain abbreviations common to cement technology for thermally processed materials are used as follows:

C represents calcium oxide (CaO)
A represents aluminum oxide ($Al_2O_3$)
F represents ferric oxide ($Fe_2O_3$)
S represents silicon dioxide ($SiO_2$).

The calcium silicates are present in two forms, tricalcium silicate ($C_3S$) called "alite" and dicalcium silicate ($C_2S$) called "belite," in proportions which depend upon the composition of the raw mix. Such silicates account, in substantial part, for the strength and setting properties of the cement.

Portland cements are classified into five major types by the ASTM, according to chemical composition and physical properties. The American Petroleum Institute (API) has classified cements into at least nine categories, such as designations A through H and J. Similar or equivalent ASTM and API cements will hereinafter be referred to exclusively by ASTM designations.

Type III (ASTM) portland cement is an early compressive strength, quick hardening cement that differs from other types of portland cement in that the alite and aluminate contents and, in particular the fineness, are generally relatively high. Type III cements are conventionally made by forming clinkers having high alite and aluminate contents and grinding the clinkers to a much higher fineness (surface area) than normal. As a result, production of Type III cements may be appreciably more energy intensive than production of Types I, II or V. Moreover, the use of additives such as calcium chloride, which are commonly used to achieve high early compressive strengths in concrete can be potentially harmful with respect to the long term durability of the resulting concrete.

Cements having high early compressive strength are required in order to satisfy industrial needs of current construction practices. For example, in construction use, where concrete is cast into forms, the forms are not normally available for reuse for one and often several days while the cement develops sufficient strength for removal of the form. Cements having high early compressive strengths allow early removal and reuse of the forms, and can also reduce the necessary curing time. Such cements are also highly desirable for prestressed and pretension applications as well as in the construction and repair of highways.

Previous attempts to formulate such cements by modifying clinker reactivity have achieved only limited success. More often, Type III portland cements are produced by grinding high $C_3S$, high $C_3A$ clinkers to a very high fineness. However, due to the high cost of the electrical energy required for fine grinding, more economically produced cement compositions of improved early compressive strength are still being sought, particularly with respect to Type III portland cement compositions.

Accordingly, an object of the invention is to produce a cement which upon hydration will develop a high early compressive strength.

Another object of the present invention is to provide a cement having a high early compressive strength without the necessity of extensive grinding during its preparation.

A further object still is to provide an inexpensive method for manufacturing modified portland-type cements from a mixture of raw materials.

Another object of the present invention is to provide a method for manufacturing a high early strength cement with a minimum change in current manufacturing methods.

A still further object of the present invention is to provide a method for manufacturing cement using presently available equipment.

These and other objects and advantages of the invention will become apparent from the following description.

SUMMARY OF THE INVENTION

The present invention is directed to a composition useful in the cement industry comprising a mixture of materials containing calcium oxide, silicon dioxide and a modifying agent. The modifying agent contains rare earth elements and mixtures thereof, particularly those containing a bastnasite concentrate derived from the production of rare earth compounds.

In one embodiment, the modifying agent contains rare earth elements in a concentration of about 0.01 to about 0.25 weight percent, calculated as the rare earth (REO), of the material produced from raw cement mix of the invention. In another embodiment, a cement composition produced from a rare earth-containing cement mix has a higher compressive strength for the same aging period as a cement composition without rare earth elements. The invention is particularly useful for cement compositions that require less grinding during preparation than similar cement compositions not containing rare earth components of the invention.

DETAILED DESCRIPTION OF THE INVENTION

Portland cement is a powdered material made by thermally processing (or thermally treating) a mixture of raw materials, one of which is usually composed mainly of calcium carbonate (as limestone) and the other usually of aluminum silicates (as clay or shale). During the thermal process, chemical reactions take place producing nodules called clinkers which are composed principally of calcium silicates ($C_2S$ and $C_3S$), aluminates ($C_3A$), and alumino-ferrites ($C_4AF$). When the clinker is pulverized with a small amount of calcium sulfate components, such as gypsum, the resulting powder is a portland cement. When a limited amount of water is mixed with such cement, a paste is formed which sets in a few hours to give a solid structure. Sand and gravel or crushed stone may be intermixed with the cement paste to form a cohesive mixture which sets to produce a dense structure known as concrete. If sand alone is mixed with the paste, a mortar is formed which can be trowelled and hardened in place to bond units of masonry structure.

The raw cement mix of the present invention is prepared from a pulverized mixture of raw materials composed of calcareous, siliceous and argillaceous type minerals containing calcium oxide and silicon dioxide, although usually aluminum oxide and iron oxide are also included. Limestone may be utilized as a source of calcium oxide. Silicon dioxide may be supplied in the form of sand. Clay or shale can be the source of aluminum oxide as well as of silicon dioxide. The source of iron oxide can be millscale, a byproduct of steel mills, pyrite cinders, a byproduct of sulfuric acid production, or iron ore. The raw materials used as a source of iron oxide also usually contain silicon dioxide and aluminum oxide. These basic raw materials are proportioned and blended to maintain their relative proportions of the oxides within known limits, and burned in a cement kiln in accordance with well known practice, to eventually produce a portland-type cement having desired properties and characteristics, as classified by ASTM or API.

In the preparation of the cement mix of the invention, a mixture of raw materials is blended with a modifying agent. Such a mixture of raw materials is then heated to elevated temperatures (i.e. thermally processed), usually greater than about 1300° C., such that the raw materials are converted to clinkers. As used herein, "thermally processed" or "thermally treated" materials relate to those raw materials, or mixtures thereof, which have been sufficiently heated to form at least some vitrified fused residue. Although a modifying agent is usually added to the raw material mixture prior to the formation of clinkers, it is within the scope of the invention that such modifying agents may be introduced at other points in the preparation process. It is preferred that the modifying agent be added in an amount sufficient to yield a thermally processed material containing about 0.01 to about 0.25 wt. %, preferably less than about 0.20 wt. %, and most preferably about 0.01 to about 0.10 wt. % of rare earth-containing components, calculated as the rare earth oxide (REO).

Suitable modifying agents include materials containing one or more rare earth elements selected from the group consisting of praseodymium, neodymium, samarium, europium, gadolinium and cerium. Rare earth compounds typically include the nitrates, sulfates, oxides, halides, carbonates, hydroxides, and the like. Mixtures of compounds containing light rare earth elements, such as praseodymium, neodymium, samarium, lanthanum, europium, gadolinium, and cerium are preferred. More preferred modifying agents contain relatively pure forms of cerium compounds, although a mixture of lanthanum carbonate and other rare earth carbonates is highly suitable. A most particularly preferred modifying agent blended into the raw cement mix of the invention is bastnasite.

Bastnasite is a rare earth fluorocarbonate mineral usually found in nature in contact with zinc loads. As the raw mineral, bastnasite contains about 65 to 80 percent of assorted rare earth elements (calculated as REO, and at present is the primary industrial source for the light rare earth elements. In particular, although containing significant proportions of praseodymium, neodymium, samarium, europium, and gadolinium, bastnasite primarily contains lanthanum and cerium, usually in proportions exceeding 80% of the total rare earth content of the mineral.

It will be understood herein that bastnasite being a chemically reactive mineral undergoes chemical changes during the conversion of the raw cement mix to clinker. Similarly, if bastnasite is utilized in the invention in a pretreated form, such as a steamed, leached or calcined form, it may have a somewhat different composition than bastnasite as found in nature. For example, it has been found that when natural bastnasite is calcined in air at a temperature of around 700° C. that the mineral undergoes a chemical reaction such that some of the rare earth fluorocarbonates therein are converted to rare earth oxyfluorides. Also, natural bastnasite may be leached with hydrochloric acid to separate strontium and barium therefrom. Thus, it is within the scope of the invention to use bastnasite in modified forms, and for purposes herein, the term "bastnasite" is meant to include not only bastnasite as found in nature (i.e. natural bastnasite) but also any material having a distribution of rare earth elements to total rare earth elements substantially similar to bastnasite. A typical chemical analysis of natural bastnasite reveals that the proportion of rare earth elements (calculated as the oxides) to the total rare earth element content (calculated as the oxides) falls within the following ranges: 45 to 55 wt. % $CeO_2$, 29–35 wt. % $La_2O_3$, 11–15 wt. % $Nd_2O_3$, 2.5 to 5.5 wt. % $Pr_2O_3$, 0.3 to 0 7 wt. % $Sm_2O_3$, 0.1 to 0.3 wt. % $Gd_2O_3$, 0.05 to 0.15 wt. % $Eu_2O_3$ and 0.05 to 0.35 wt. % of other rare earth elements, calculated as $RE_2O_3$. For purposes herein, a material is considered to be bastnasite when its proportions of rare earth elements (in elemental or combined forms) to total rare earth elements (in elemental or combined forms) are substantially within the foregoing ranges. Highly preferred modifying agents include bastnasite concentrates and acid leach bastnasite concentrates, such as Bastnasite 4000 and Bastnasite 4010 concentrates, produced by Molycorp, Inc., a subsidiary of Union Oil Company of California.

Clinkering of the raw material mixture of the invention occurs by thermal processing. The thermal processing conditions include residence time usually greater than about 15 minutes, and typically about 1 to about 5 hours, and an elevated temperature typically greater than about 1300° C., usually about 1400° C. to about 1600° C., and preferably about 1450° C. to about 1550° C. Other conditions required for the high temperature processing (>1300° C.) include an atmosphere, containing preferably less than about 20 and more preferably less than about 5 volume percent $O_2$. It is highly preferred that the atmosphere contain about 1 to about 4 volume percent $O_2$, such as that commonly found in the burning zone of a cement kiln For example, the burning zone of the kiln may have an atmosphere containing about 78 volume percent $N_2$, 18 volume percent $CO_2$, 2 volume percent $H_2O$ and 2 volume percent $O_2$.

A particulate composition of the invention is produced by grinding the thermally treated materials (clinker). Clinkers are usually ground together with additions of calcium sulfate components, such as gypsum, to produce the finished cement products. Cements, according to the invention, are typically ground so as to have a surface area less than or equivalent to that of cements produced from the same material mixture without a modifying agent of the invention. The surface area of the cement, calculated as Blaine fineness in $cm^2/gram$, may be as high as 10,000, or more. However, the surface area is often less than about 6,000, preferably less than about 5,000, and most preferably less than about 4,500 and ordinarily in the range from about 2,500 to about 5,000, with a range from about 3,000 to about 4,500 being highly preferred. Such surface areas are especially useful in cements designed to give high early strengths, such as Type III portland cements.

The particulate cement composition of the invention containing ground clinkers, and optionally a calcium sulfate component, is useful for forming a cement paste upon addition thereto of a sufficient amount of water, and eventually the paste cures into a solid cement paste composition. During the preparation of the paste, ground cement powders of the present invention typically require water-mixing amounts for hydration similar to those for portland cement types. The weight ratio of water to cement powder is usually in the range from about 0.2 to about 0.8, with lower values producing higher compressive strength increases. Over equivalent aging periods, cement paste compositions of the invention have an equivalent or higher compressive strength, calculated in $pounds/inch^2$ (psi), than a cement paste composition produced from the same cement mixture without the modifying agent. As shown hereinafter in the Examples, the cement paste compositions of the invention exhibit higher compressive strengths when tested at 1, 3, 7 and 28 day aging periods as compared to similar cement paste compositions without the modifying agents of the invention.

After extended aging, typically for 28 days or more, a solid cement paste composition produced from the ground cement powder of the invention exhibits, upon addition of water at a water:cement weight ratio of 0.5:1, a compressive strength greater than about 8,000 $lbs/in.^2$ (psi), and preferably greater than about 9,000 $lbs/in.^2$.

In one embodiment of the invention, modifying agents containing rare earth elements are added to a raw material mixture at any time prior to clinkering. It is preferred that the addition of the rare earth-containing components be sufficient to yield a thermally processed composition containing rare earth components in a range of about 0.01 to about 0.25 weight percent, calculated as REO. The rare earth-containing components may be intimately blended and intermixed with the raw pulverized mixture or can be added during the initial raw feed grinding process. In any event, the blended raw material mixture containing the ground rare earth-containing component is fed to a kiln for clinkering. Any kiln, furnace or the like may be employed in which the temperature and residence time can be controlled. Clinkers, with the addition of gypsum and other desired additives, are ground to a fineness of at least about 2,500 $cm^2/gram$ (Blaine), and preferably not more than about 5,000, $cm^2/gram$ (Blaine) to form a dry cement powder. The dry cement powder is then capable, when hydrated with water, at a 0.5:1 water:cement weight ratio, of giving high early compressive strength, typically greater than about 3,000 $lbs/in.^2$ (psi) for 3 days or more of aging and greater than about 8,000 lbs./in. for 28 days or more of aging. Such cement compositions are useful in the manufacture of pre-cast concrete and of other concretes where high early strengths are required, such as in the repair of highways.

The invention is further illustrated by the following examples which are illustrative of specific modes of practicing the invention and are not intended as limiting the scope of the invention defined by the appended claims.

EXAMPLE I

Cement compositions prepared in accordance with the invention are tested for compressive strength against a reference composition R.

All the compositions, including the reference, are prepared from the same mixture of raw materials which is initially calcined at 1000° C. Modifying agents containing rare earth concentrates are blended with the calcined mixture to form blends BW, BX, BY, BZ, CW, CX, CY, CZ, LW, LX, LY and LZ shown hereinafter in Table 2. The modifying agents, obtained from Molycorp, Inc., are identified as rare earth concentrate No. 4000, containing unleached bastnasite concentrate (used in blends BW, BX, BY or BZ), No. 5300 containing cerium concentrate (used in blends CW, CX, CY and CZ) and No. 5230, containing a mixture of lanthanum and other rare earth carbonate concentrates (used in blends LW, LX, LY and LZ).

Raw cement mix blends containing the rare-earth concentrates (shown in Table 2) and reference raw cement mix R, containing essentially no rare earth concentrates, are then burned for 30 minutes at a temperature of 1450° C. under a flowing atmosphere to form clinkers. The flowing atmosphere contains 2 volume percent $O_2$ and 2 volume percent $H_2O$, with the remainder being mainly $N_2$ and $CO_2$. The resulting clinkers formed from the reference raw cement mix R have the composition shown below in Table 1, while those formed from the blended raw cement mixes of the invention contain rare earth addition levels of 0.02, 0.05, 0.10, and 0.20 wt. percent, calculated as REO, relative to the clinker composition in Table 1. (For convenience, compositions containing letters W, X, Y and Z, correspond to rare earth addition levels of 0.02, 0.05, 0.10 and 0.20 wt. percent, respectively.)

TABLE 1

| RAW CEMENT MIX R | |
|---|---|
| Oxide Composition* | |
| (Ignited basis, wt. %) | |
| $SiO_2$ | 23.3 |
| $Al_2O_3$ | 4.4 |
| $Fe_2O_3$ | 3.1 |
| CaO | 66.2 |
| MgO | 1.3 |
| $SO_3$ | 0.2 |

TABLE 1-continued

| RAW CEMENT MIX R | |
|---|---|
| Na$_2$O | 0.3 |
| K$_2$O | 0.4 |
| Potential Compound Content (Bogue Calculation, wt. % | |
| C$_4$AF | 9.4 |
| C$_3$A | 6.5 |
| C$_2$S | 23.2 |
| C$_3$S | 57.9 |
| Moduli | |
| Lime Saturation Factor | 91.5 |
| Silica Modulus | 3.12 |
| Iron Modulus | 1.44 |

*Determined by analysis of reference R clinkers.

The clinkers are air cooled and ball milled to a Blaine fineness as shown in Table 2. Also, two portions of clinkers prepared from reference raw cement mix R, identified as RA and RB, are further ground to a Blaine fineness of 4,506 cm$^2$/gram and 5,214 cm$^2$/gram, respectively. Finely divided (3500 cm$^2$/gram) "Terra Alba" gypsum is then added to each mix in an amount designed to give an overall SO$_3$/Al$_2$O$_3$ molar ratio of about 0.6.

A cement composition in the form of a cement paste is then formed with each mix and water. The weight ratio of water to cement mix is 0.5 for all paste preparations. Twelve 1-inch cement paste cubes are cast for each mix, and three cubes are tested, deriving a mean value for compressive strength at ages 1, 3, 7 and 28 days. In addition, a non-standard "time of set" value was determined as the time beyond which penetration of a 2 mm Vicat needle to a depth of more than 10 millimeters no longer occurred. The compressive strength data of the cement compositions of the invention as compared to the reference compositions are summarized below in Table 2.

concentrates or mixtures thereof, exhibit higher compressive strengths for the same aging period than comparative cement compositions containing essentially no rare-earth elements. Particularly good results are exhibited by cement compositions of the invention containing rare earth elements from about 0.02 to about 0.10 weight precent, calculated as REO in clinker, for 1, 3 and 7 day aging periods.

When compared to compressive strength data for cement paste cubes of the invention, the data summarized in Table 2 indicate that althpugh increased fineness of the clinker improves the compressive strengths for the reference cement composition R, at ages up to at least 7 days, paste cubes prepared in accordance with the invention exhibit equivalent and improved compressive strengths at a lower ground fineness of the clinker. For example, preparation blends BW, BX, and BY, whose clinkers are ground to a Blaine fineness of about 1,000 cm$^2$/gram less than those of reference preparation blend RA, produce cement compositions of the invention that exhibit superior compressive strength results for 1 and 3 day aging periods as compared to reference cement composition RA. Initial setting times are not significantly affected by use of the additives according to the invention.

EXAMPLE II

Cement compositions prepared in accordance with the invention are tested under typical conditions for compressive strength against a reference composition R2.

The preparation of reference cement composition R2 and compositions of the invention, identified as BW2, BX2, BY2 and BZ2, is similar to the preparation in Example I of cement composition R and compositions BW, BX, BY and BZ of the invention (containing unleached bastnasite concentrate), except the composition of the raw cement mix R2 is different as shown by the

TABLE 2

PASTE CUBE COMPRESSIVE STRENGTH RESULTS FOR CEMENT COMPOSITIONS

| PREPARATION BLEND AND COMP. | Reference (No Additives) | | | Unleached Bastnasite Concentrate | | | | Cerium Concentrate | | | | Lanthanum/Rare Earth Carbonate | | | |
|---|---|---|---|---|---|---|---|---|---|---|---|---|---|---|---|
| | R | RA | RB | BW | BX | BY | BZ | CW | CX | CY | CZ | LW | LX | LY | LZ |
| REO in Clinker, wt. % | 0 | 0 | 0 | 0.02 | 0.05 | 0.10 | 0.20 | 0.02 | 0.05 | 0.10 | 0.20 | 0.02 | 0.05 | 0.10 | 0.20 |
| Clinker Blaine Fineness, cm$^2$/g: | 3,498 | 4,506 | 5,214 | 3,553 | 3,537 | 3,481 | 3,430 | 3,560 | 3,432 | 3,495 | 3,460 | 3,470 | 3,495 | 3,544 | 3,517 |
| Cement Blaine Fineness, cm$^2$/g: | 3,655 | 4,695 | 5,676 | 3,665 | 3,697 | 3,690 | 3,665 | 3,627 | 3,605 | 3,610 | 3,680 | 3,616 | 3,680 | 3,616 | 3,616 |
| Initial Time of Set, Minutes: | 320 | 300 | 160 | 330 | 350 | 350 | 380 | 310 | 290 | 300 | 400 | 350 | 310 | 360 | 330 |
| 1-Day Compressive Strengths | | | | | | | | | | | | | | | |
| (Mean) | 1,213 | 1,323 | 1,875 | 1,712 | 1,572 | 1,495 | 1,280 | 1,400 | 1,600 | 1,570 | 1,478 | 1,148 | 1,360 | 1,208 | 1,130 |
| Standard Deviation: | 111 | 49 | 149 | 70 | 45 | 126 | 80 | 90 | 40 | 69 | 59 | 8 | 56 | 64 | 117 |
| 3-Day Compressive Strengths | | | | | | | | | | | | | | | |
| (Mean) | 2,600 | 3,433 | 5,067 | 3,633 | 3,633 | 3,733 | 3,267 | 3,300 | 3,800 | 3,900 | 3,800 | 3,167 | 3,433 | 3,133 | 2,733 |
| Standard Deviation: | 458 | 153 | 153 | 462 | 569 | 231 | 115 | 346 | 200 | 100 | 200 | 231 | 252 | 58 | 58 |
| 7-Day Compressive Strengths | | | | | | | | | | | | | | | |
| (Mean) | 5,200 | 6,867 | 8,100 | 6,667 | 6,733 | 6,200 | 5,067 | 5,833 | 6,400 | 6,700 | 6,533 | 6,333 | 6,567 | 5,733 | 5,350 |
| Standard Deviation: | 651 | 436 | 808 | 802 | 173 | 643 | 115 | 700 | 1,253 | 231 | 208 | 611 | 586 | 250 | 100 |
| 28-Day Compressive Strengths | | | | | | | | | | | | | | | |
| (Mean) | 9,133 | 10,700 | 10,366 | 10,967 | 9,733 | 8,967 | 9,233 | 10,433 | 10,767 | 11,233 | 11,000 | 9,700 | 9,300 | 13,667 | 9,133 |
| Standard Deviation: | 896 | 600 | 1,380 | 709 | 666 | 1,021 | 1,155 | 404 | 929 | 252 | 200 | 608 | 1,308 | 2,887 | 473 |

The data in Table 2 indicate that at approximately the same level of fineness, i.e., clinkers ground to about 3500 cm$^2$/gram Blaine fineness, cement compositions containing rare earth elements, either single element analysis of the composition of the R2 clinker in Table 3 below.

TABLE 3

RAW CEMENT MIX R2

| Oxide Composition* (Ignited basis, wt. %) | |
|---|---|
| $SiO_2$ | 20.8 |
| $Al_2O_3$ | 5.7 |
| $Fe_2O_3$ | 4.2 |
| CaO | 64.9 |
| MgO | 1.1 |
| $SO_3$ | 1.6 |
| $Na_2O$ | 0.1 |
| $K_2O$ | 0.9 |
| Potential Compound Content (Bogue Calculation, wt. %) | |
| $C_4AF$ | 12.8 |
| $C_3A$ | 7.9 |
| $C_2S$ | 13.1 |
| $C_3S$ | 61.7 |
| Moduli | |
| Lime Saturation Factor | 96.2 |
| Silica Modulus | 2.10 |
| Iron Modulus | 1.35 |

*Determined by analysis of reference R2 clinkers

A cement paste, prepared with a water/cement ratio of 0.5 for all preparations, is formed with each mix. The data from reference cement composition R2 and compositions of the invention relating to compressive strength and time of set, tested by the same method as in Example 1, are summarized in Table 4 below.

TABLE 4

CEMENT PASTE RESULTS FOR RAW CEMENT MIX R2

| PREPARATION BLEND AND COMP | R2 | BW2 | BX2 | BY2 | BZ2 |
|---|---|---|---|---|---|
| REO, wt. % of clinker | 0 | 0.02 | 0.05 | 0.10 | 0.20 |
| Blaine fineness of cement, $cm^2/g$ | 3,443 | 3,448 | 3,530 | 3,464 | 3,456 |
| Initial time of set, minutes | 435 | 380 | 400 | 380 | 370 |
| 1-day comp. strengths, psi (Mean) | 1,913 | 2,250 | 2,167 | 2,300 | 2,067 |
| Standard deviation | 40 | 50 | 58 | 100 | 58 |
| 3-day comp. strengths, psi (Mean) | 4,433 | 4,900 | 4,467 | 4,667 | 4,700 |
| Standard deviation | 58 | 100 | 58 | 153 | 173 |
| 7-day comp. strengths, psi (Mean) | 6,200 | 6,833 | 5,533 | 6,733 | 6,867 |
| Standard deviation | 624 | 737 | 252 | 379 | 351 |
| 28-day comp. strengths, psi (Mean) | 8,600 | 9,567 | 9,633 | 9,267 | 10,000 |
| Standard deviation | 173 | 404 | 321 | 115 | 400 |

The data in Table 4 indicate that shorter set times and higher compressive strengths for the same aging periods are exhibited by cement compositions, BW2, BX2, BY2 and BZ2 as compared to reference cement composition R2. As little as 0.02 weight percent of unleached bastnasite, calculated as REO in clinker, (cement composition, BW2,) effects an increase in the compressive strength of a cement composition over 1, 3, 7 and 28 day aging periods. Furthermore, although raw cement mix R2 contains about 8 times as much $SO_3$ content in the composition of clinkers produced therefrom as clinkers produced from raw cement mix R at Example 1 (i.e. 1.6 wt. % vs 0.2 wt. %), compositions BW2, BX2, BY2 and BZ2, containing rare earth concentrates, still exhibit a significant increase in compressive strength as compared to the reference cement paste cube, R2.

Although particular embodiments of the invention have been described, it will be understood, of course, that the invention is not limited thereto since many obvious modifications can be made, and it is intended to include within this invention any such modifications as will fall within the scope of the invention as defined by the appended claims.

I claim:

1. A particulate raw cement mix comprising bastnasite, a calcium oxide component and a silicon dioxide component.

2. A particulate cement composition produced by thermally treating said raw cement mix defined in claim 1.

3. The composition defined in claim 2 comprising about 0.01 to about 0.25 weight percent, calculated as REO, of one or more rare earth elements.

4. The composition defined in claim 2 having a surface area less than about 6000, calculated as Blaine fineness in $cm^2$/gram.

5. The composition defined in claim 1 wherein said bastnasite is unleached concentrate.

6. A solidified cement material produced by admixing the particulate cement composition of claim 2 with water and aging the resulting admixture.

7. The cement material defined in claim 6 having a higher compressive strength, calculated in pounds/$inch^2$, when tested after 1 day of aging than the same cement material produced from said raw cement mix without said bastnasite.

8. The cement material defined in claim 7 wherein said compressive strength is higher when tested after 3 days of aging than the same cement material produced from said raw cement mix without said bastnasite.

9. The cement material defined in claim 7 wherein said compressive strength is higher when tested after 7 days of aging than the same cement material produced from said raw cement mix without said bastnasite.

10. The cement material defined in claim 7 wherein said compressive strength is higher when tested after 28 days of aging than the same cement material produced from said raw cement mix without said bastnasite.

11. The composition defined in claim 1 further comprising an iron oxide $Fe_2O_3$ component.

12. The composition defined in claim 1 further comprising an aluminum oxide $Al_2O_3$ component.

13. The composition defined in claim 11 further comprising a calcium sulfate component.

14. A particulate portland cement composition comprising a thermally processed material containing between about 0.01 and about 0.20 weight percent of at least one rare earth component, calculated as REO, said rare earth component selected from the group consisting of cerium, europium, samarium, praseodymium, neodymium, gadolinium and compounds thereof, and said composition having a surface area less than about 6000, calculated as Blaine fineness in $cm^2$/gram.

15. The composition defined in claim 14 wherein said rare earth component is present in a concentration between about 0.01 and about 0.1 weight percent, calculated as REO.

16. A solidified cement material produced by admixing with water the particulate cement composition of claim 14 and aging the resulting admixture.

17. The composition defined in claim 16, said composition having a higher compressive strength, calculated in pounds/$in^2$, when tested at 1 day than the same cement composition without said material containing a rare earth element.

18. The composition defined in claim 16 wherein said compressive strength is higher when tested after 3 days of aging than the same cement composition without said material containing a rare earth element.

19. The composition defined in claim 16 wherein said compressive strength is higher when tested after 7 days of aging than the same cement composition without said material containing a rare earth element.

20. The composition defined in claim 16 wherein said compressive strength is higher when tested after 28 days of aging than the same cement composition without said material containing a rare earth element.

21. A composition prepared by the method comprising the following steps:
   (1) adding a modifying agent to a cement raw mix composition, said modifying agent containing components having one or more rare-earth elements selected from the group consisting of cerium, europium, samarium, praseodymium neodymium and gadolinium in a concentration between about 0.01 and about 0.20 weight percent, calculated as REO, of said product obtained from step (2),
   (2) thermally processing the product obtained from step (1) to produce a solid product, and
   (3) pulverizing said product obtained from step (2) to produce a finished composition having a surface area less than about 6000, calculated as Blaine fineness in $cm^2/gram$.

22. The composition defined in claim 21 wherein said modifying agent comprises bastnasite.

23. The composition defined in claim 21 wherein said concentration is less than about 0.20 weight percent.

24. The composition defined in claim 21 wherein said surface area is about 2,500 to about 5,000, calculated as Blaine fineness in $cm^2/gram$.

25. The composition defined in claim 21 wherein said modifying agent is a mixture of said rare earth elements and lanthanum carbonate.

26. The composition defined in claim 21 wherein said cement composition comprises Type III portland cement.

27. A solid cement composition comprising (1) cement containing a tricalcium silicate component and (2) greater than about 0.01 to less than about 0.20 weight percent of rare earth elements, calculated as REO said rare earth elements selected from the group consisting of cerium, europium, samarium, praseodymium, neodymium, gadolinium and compounds thereof.

28. The composition defined in claim 27 having a compressive strength greater than about 8000 $lbs/in^2$ when tested after 28 days of aging and having a compressive strength greater than the same solid cement composition without said rare earth elements.

29. The composition defined in claim 27 having a compressive strength greater than about 3000 $lbs/in^2$ when tested after 3 days of aging and having a compressive strength greater than the same solid cement composition without said rare earth elements.

30. The composition defined in claim 14 wherein said rare earth component is mixed with lanthanum carbonate.

31. The composition defined in claim 15 further comprising a calcium sulfate component.

32. The composition defined in claim 16 further comprising a calcium sulfate component.

33. A solidified cement material produced by admixing with water the particulate portland cement composition of claim 15 and aging the resulting admixture.

34. A solidified cement material produced by admixing with water the particulate portland cement composition of claim 31 and aging the resulting admixture.

* * * * *

UNITED STATES PATENT AND TRADEMARK OFFICE
CERTIFICATE OF CORRECTION

PATENT NO. : 4,619,702
DATED : 10/28/86
INVENTOR(S) : Ellis M. Gartner

It is certified that error appears in the above-identified patent and that said Letters Patent are hereby corrected as shown below:

Lines 25 and 26 of Table 2, delete "Standard Deviation: 651 436 808 802 173 643 115 700 1,253 231 208 611 586 250 100" and insert therefor --Standard Deviation: 100 651 436 808 802 173 643 115 700 1,253 231 208 611 586 250--.

Col. 12, claim 34, lines 35-36, delete "composition of claim 31" and insert therefor --composition of claim 30--.

Signed and Sealed this

Seventeenth Day of November, 1987

Attest:

DONALD J. QUIGG

Attesting Officer

Commissioner of Patents and Trademarks